Figure 1:
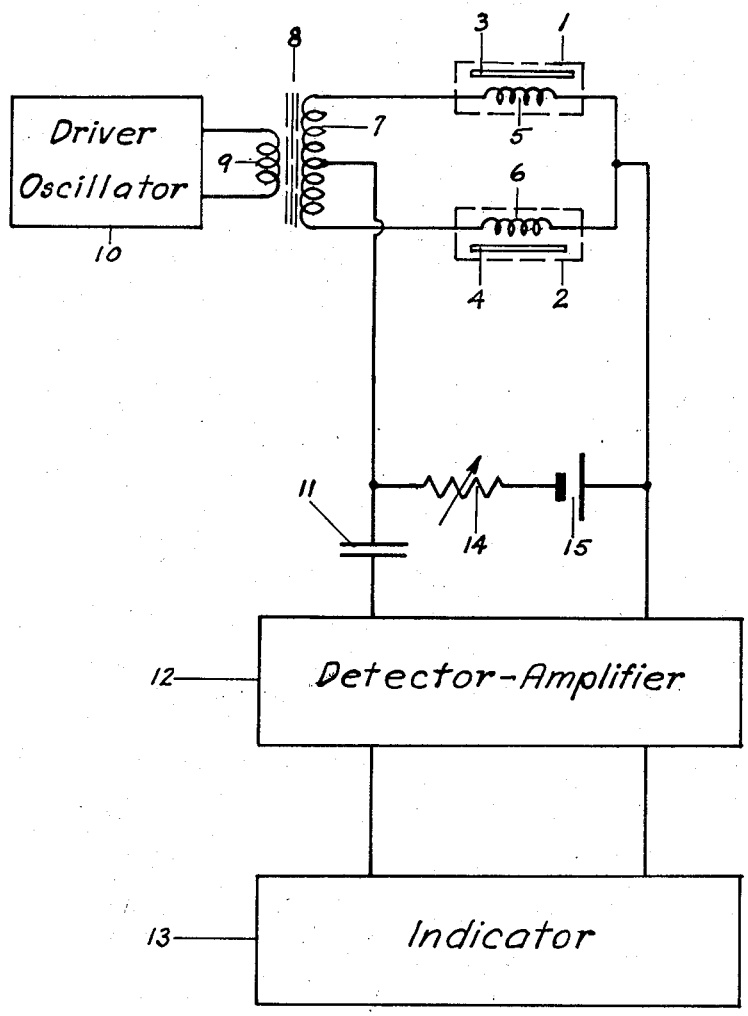

Nov. 13, 1956  H. B. RIBLET  2,770,774
BALANCED MAGNETOMETER
Filed May 10, 1944  2 Sheets-Sheet 2

INVENTOR
HENRY B. RIBLET
BY
ATTORNEYS

United States Patent Office 2,770,774
Patented Nov. 13, 1956

2,770,774

BALANCED MAGNETOMETER

Henry B. Riblet, Elmhurst, N. Y., assignor to the United States of America as represented by the Secretary of the Navy Application May 10, 1944, Serial No. 534,961

2 Claims. (Cl. 324—43)

This invention relates to an improved balanced magnetometer for measuring a magnetic field, and more particularly to a magnetometer of the saturated-core type especially adapted for use in measuring changes in the earth's magnetic field.

Previously proposed types of balanced magnetometers have employed a pair of magnetometer elements each having a magnetic core and at least two windings. One winding on each core was used to supply the driving magnetizing force, and the other winding on each core was connected to the detector and served as a means for picking up the output signal from the magnetometer elements. Magnetometers of this four-coil type were relatively difficult and expensive to manufacture, due to the necessity for careful matching of the respective sets of windings. Furthermore, such magnetometers were relatively bulky and poorly adapted for use in those applications where the maximum compactness and minimum weight were factors of importance, as for example in magnetometers in which the elements were gimbal-mounted in such a way as to be freely movable in one or more planes. Magnetometers of this type were characterized by appreciable capacitive coupling between the drive and detector circuits, due to the proximity of the windings on each core. This was extremely disadvantageous in that it tended to introduce undesired output signals which rendered recognition of the desired output signal difficult.

It is an object of the present invention, therefore, to provide an improved balanced magnetometer of the saturated-core type which employs magnetometer elements each having only one coil. Such an improved type of magnetometer is relatively inexpensive and simple to construct, and its compactness and low weight adapt it particularly well to applications in which the magnetometer element is gimbal-mounted. In the improved type of magnetometer here disclosed, each of the coils serves simultaneously as means for producing a driving flux in the magnetic core and as means for picking up the resultant induced voltage. Furthermore, the simplified magnetometer here disclosed is entirely free from capacitive coupling between the drive and output circuits, substantially reducing the likelihood that the desired output signal will be masked by undesired responses.

In accordance with the present invention, a magnetometer is provided which comprises a pair of substantially identical magnetometer elements each having a magnetic core and a winding. These magnetometer elements are disposed with their magnetic axes parallel and the windings are so connected that similar poles of the cores are oppositely directed. There is provided a bridge circuit having output terminals and including the windings and a source of alternating drive voltage. As a result, the output signal appearing at the output terminals comprises a series of pulses, the amplitude and polarity of which provide information regarding the strength and the direction of the magnetic field surrounding the magnetometer elements.

For a better understanding of the invention, together with other and further objects thereof, reference is made to the following description taken in connection with the accompanying drawing, and its scope will be pointed out in the appended claims.

Figure 2:
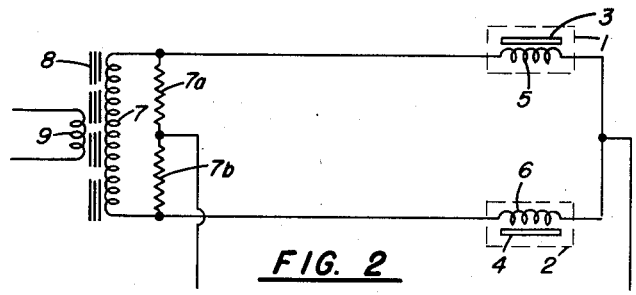
Figure 3:
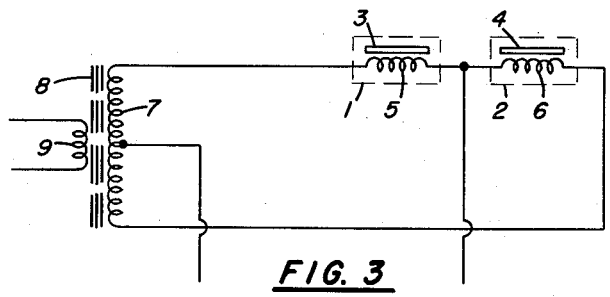

Fig. 1 shows a preferred form of the present invention, partly in block form;

Fig. 2 discloses an alternate form of the invention;

Fig. 3 discloses another modification of the invention; while

Figure 4:
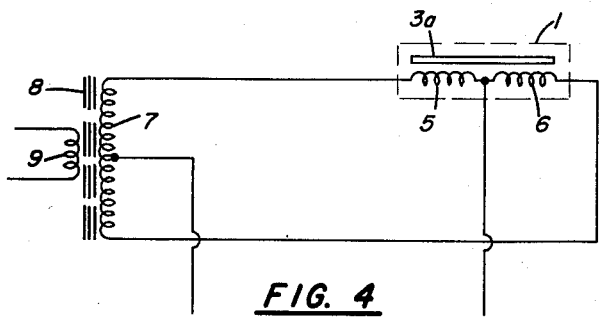

Fig. 4 illustrates still another modification thereof.

Referring now to the drawing, there is shown a pair of magnetometer elements 1 and 2 having respectively magnetic cores 3 and 4 and windings 5 and 6. These cores and windings, although respectively substantially identical, have been designated by different reference numerals for simplicity of explanation. Windings 5 and 6 are connected in series aiding between the terminals of center-tapped secondary winding 7 of transformer 8. Primary winding 9 of transformer 8 is connected to the output of driver oscillator 10.

The center tap of winding 7 is connected, through capacitor 11, to one input terminal of detector-amplifier 12, the other input terminal of which is connected to the junction of windings 5 and 6. The output of detector-amplifier 12 is connected to indicator 13.

A series network comprising variable resistor 14 and battery 15 is connected between the center tap of winding 7 and the junction of windings 5 and 6.

In operation, driver oscillator 10 provides an alternating driving voltage, which is preferably but not necessarily sinusoidal in wave form. By means of transformer 8, this driving voltage is impressed upon windings 5 and 6, with the result that magnetic cores 3 and 4 are periodically driven, first in one direction and then in the other, well beyond their magnetic saturation points. As is well known to those skilled in the art, sharply peaked pulse voltages, which are the resultant of the voltages induced in windings 5 and 6, appear at the output. The amplitude and polarity of the pulses provide information regarding the strength and the direction of the magnetic field under observation. It is this pulsed output signal which is supplied, through capacitor 11, to detector-amplifier 12. The rectified and amplified output signal of the latter unit is supplied to indicator 13, which in turn provides a visual or graphical or other suitable indication of the magnetometer output.

The purpose of variable resistor 14 and battery 15 is to provide an adjustable direct current which flows in the same direction through windings 5 and 6, and which thus serves to balance out the effect of the earth's magnetic field in those cases where a small change in the field is the quantity to be measured. It will be understood that the arrangement for supplying this direct current may be modified or eliminated without departing from the scope of the present invention.

It is pointed out that, as will be obvious to those skilled in the art, transformer 8 could be replaced by a transformer having only two secondary terminals, the lead now connecting to the center tap of winding 7 being connected to the junction of a pair of equal resistors 7a and 7b shunted across the secondary winding as disclosed in Fig. 2.

In one successful embodiment of the invention, magnetic cores 3 and 4 comprised mu-metal strips having a length of five inches, a width of 0.15 inch and a thickness of 0.014 inch. Windings 5 and 6 each comprised 2,000 turns. Transformer 8 had a step-down turns ratio between the primary winding and the whole secondary winding of 5:1. The frequency of driver oscillator 10 was 60 cycles per second. Variable resistor 14 had a maximum resistance of 5,000 ohms, and battery 15 had a voltage of six volts. Capacitor 11 had a capacitance of 2.0 microfarads.

In addition to the more obvious uses to which the present invention may be put, it is pointed out that it may also be used as a means for matching magnetic cores, this being accomplished by letting magnetic core 3, for example, be the standard while magnetic core 4 is the bar to be matched thereto. Furthermore, since this type of magnetometer is especially sensitive to the physical configuration of the magnetic cores, the arrangement here disclosed lends itself well for use as a strain gauge in which the strain to be measured produces a deformation of one or both of magnetic cores 3 and 4, or even a change in the position of one element with respect to the other. These and other uses of the invention which will occur to those skilled in the art are well within its scope.

Although in a preferred embodiment of the invention magnetometer elements 1 and 2 are disposed with their magnetic axes parallel, in particular cases it may be desirable to dispose the elements in some other manner. For example, the two magnetic cores, 3 and 4 in the drawing, may be disposed coaxially as illustrated in Fig. 3 instead of side by side as shown in Fig. 1, or they may be replaced by a single core $3a$ on which both of windings 5 and 6 are mounted as illustrated in Fig. 4.

In addition to its use for measuring the earth's magnetic field or small changes therein, the magnetometer in accordance with the present invention is especially well adapted for use in securing magnetic stabilization or orientation of a plane in a desired position with respect to the earth's magnetic field, in the manner disclosed in copending application Serial No. 529,003, filed March 31, 1944, Magnetic Stabilization System, D. G. C. Hare, now Patent No. 2,689,333, issued September 14, 1954.

It will be understood, by those skilled in the art, that the apparatus herein disclosed, while shown and described as a magnetometer, may be utilized equally well as an incremometer or gradiometer for measuring the difference in a magnetic field at two points. To accomplish this, the connections to one of the element windings are reversed. The arrangement for neutralizing the effect of the earth's field, if employed at all, must be altered so that the direct-current flow through the two windings is still in the same direction.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:
1. Apparatus for detecting the variation of a magnetic field comprising a pair of substantially identical magnetometer elements each having a magnetic core and a winding, a transformer having a center-tapped secondary, said windings being so disposed that their magnetic axes are parallel and said windings are so connected in a series with said transformer secondary that similar poles of the cores are oppositely directed, means for operating said transformer to provide substantial saturation voltages in said windings, output terminals connected to the junction of said windings and to said center tap for delivering an output signal whose characteristics are dependent upon the magnetic field surrounding the detecting apparatus, a source of direct current connected across said terminals through a potentiometer, and means for detecting the output signal impulses to indicate any change in the surrounding magnetic field.

2. Apparatus for indicating the variation of a surrounding magnetic field, comprising in combination a pair of magnetometer elements each having a single core and winding so disposed that their magnetic fields are parallel and of opposite polarity, a transformer whose secondary is connected in series with said windings to form a bridge circuit, terminals connected to the junction of said windings and to a center tap on said secondary for obtaining an output signal dependent upon the strength of the magnetic field and whose primary winding is supplied with periodically varying driving power of sufficient magnitude to cause impulses substantially saturating said cores, a source of direct-current potential connected across said terminals to adjust the value of said output signal, detecting and amplifying apparatus for utilizing said adjusted output signal, and indicating means operated by said rectified and amplified output signal to determine any variation in the surrounding magnetic field.

References Cited in the file of this patent
UNITED STATES PATENTS

| | | |
|---|---|---|
| 2,035,248 | Scott | Mar. 24, 1936 |
| 2,047,609 | Antranikiam | July 14, 1936 |
| 2,158,500 | Guerra | May 16, 1939 |
| 2,213,357 | Barth | Sept. 3, 1940 |
| 2,252,059 | Barth | Aug. 12, 1941 |
| 2,329,021 | Walsh | Sept. 7, 1943 |
| 2,388,070 | Middel | Oct. 30, 1945 |
| 2,390,051 | Barth | Dec. 4, 1945 |
| 2,406,870 | Vacquier | Sept. 3, 1946 |
| 2,407,202 | Vacquier | Sept. 3, 1946 |
| 2,415,808 | Buckley | Feb. 18, 1947 |

OTHER REFERENCES
Serial No. 402,530, Barth (A. P. C.), published May 18, 1943.